BEST AVAILABLE COPY

Garry I. Mix Impt. in Making Iron Spoons

4506

REISSUED AUG 8 1871

Witnesses
Geo. Haymes
W. Tuck Jr.

Garry I. Mix
per Thos. Lombard & Co
Attorneys

AM. PHOTO-LITHOGRAPHIC CO. N.Y. (OSBORNE'S PROCESS.)

UNITED STATES PATENT OFFICE.

GARRY I. MIX, OF YALESVILLE, CONNECTICUT.

IMPROVEMENT IN IRON SPOONS.

Specification forming part of Letters Patent No. 18,513, dated October 27, 1857; reissue No. 4,506, dated August 8, 1871.

*To all whom it may concern:*

Be it known that I, GARRY I. MIX, formerly of Wallingford, in the county of New Haven and State of Connecticut, but now of Yalesville, in said county and State, have invented a new and useful Improvement in Iron Spoons; and I do hereby declare that the following is a full, clear, and exact description of the same, reference being had to the accompanying drawing forming part of this specification, and in which—

Figure 1:
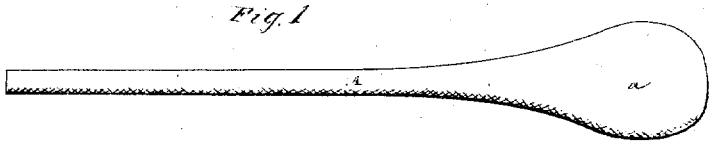
Figure 3:
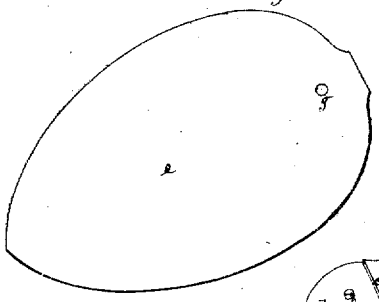
Figure 2:
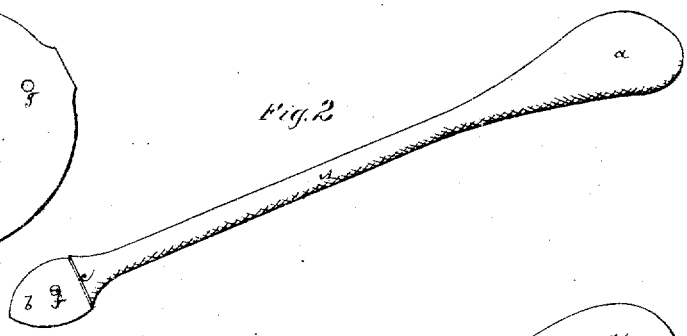

Figure 1 represents a view of a spoon-handle, when made from wire, partly completed; Fig. 2, a perspective view of said handle fully completed and ready for attachment to the bowl or bowl-blank; Fig. 3, a view of a blank of which the bowl of the spoon is formed; and Fig. 4, a view of a spoon completed.

Similar letters of reference indicate corresponding parts throughout the several figures.

The object of this invention is to produce an iron spoon which shall be cheaper and neater than can be made by forging and turning, as practiced prior to my invention. By the forging process it has only been practicable, in a general way at least, to produce a very rude article, on which, when finished, the marks of the hammer were more or less visible; whereas by my improvement iron spoons may be made free from these defects, and so that they are suitable not only for culinary purposes, but, by the neatness of their appearance, for table or general use, with the same strength in the shank and handle as when forged, without, however, being clumsy or unnecessarily thick at any one portion, and serving as substitutes for spoons made of more expensive metals, or from various alloys or compositions. Furthermore, while most or all composition spoons, like those made of any soft metal, are easily bent and liable to be indented and bruised, such is not the case with iron spoons, which are both hard and durable. The invention consists in an iron spoon having its handle and bowl made of separate pieces, cut, pressed, or otherwise shaped by dies or rollers to give the necessary strength to the shank and perfect symmetry to the entire spoon; also, being made to lap at their meeting ends, the one under or over the other, subject to support by a shoulder formed on one of the pieces and soldered or otherwise suitably united, substantially as hereinafter described. The invention also includes an iron spoon in which the rivet that unites the bowl to the handle is made of the same piece of metal with and forms a part of the handle.

Figure 4:
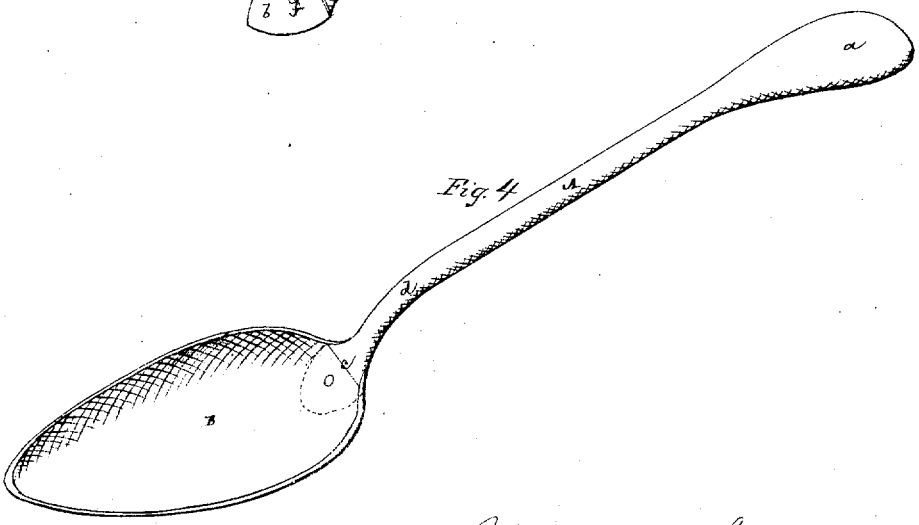

Referring to the accompanying drawing, the handle A of the spoon may, for convenience sake, be made of a piece of iron wire of the requisite thickness and length. One end of this wire is swaged, by means of proper dies or rollers, to form the usual flattened outer end of the handle, as shown at *a*, Fig. 1. The opposite or inner end of said handle A is also flattened, as shown at *b* in Fig. 2, and is formed or provided with a shoulder, *c*. The inner end of the handle is also shown curved, as at *d*, in Fig. 4. The bowl B of the spoon may be formed by cutting an oval or approximately so shaped plate or blank, *e*, Fig. 3, out of a piece of plate iron and then striking, by means of dies, said blank in the usual concave form, as shown in Fig. 4. The inner end of the handle A, at its flattened or recessed portion *b*, has a stud or pin, *f*, which is formed of the same piece with the handle, and may be raised thereon by means of a hole in the one die that is used to flatten or shape the inner end of the handle, said stud or pin forming the rivet that unites the bowl to the handle. The portion *b* of the handle having the pin or rivet thus formed on it is fitted to the inner end of the bowl-blank *e*, the pin *f* passing through a hole, *g*, in said blank, and the latter, which is shaped to fit the portion *b* of the handle, being arranged so that its inner end abuts against the shoulder *c*. This fit of the bowl and handle, one under or over and within the other, as it were, and so that the one piece rests against a shoulder of the other piece, materially assists and strengthens the union of the bowl and handle. The pin *f* is then riveted and the bowl and handle preferably soldered together.

Tinned or galvanized-iron spoons are preferable to German-silver ones and to spoons made from various compositions, inasmuch as German silver soon tarnishes or turns yellow and resembles brass, while other compositions leave an unpleasant taste in the mouth or are objectionable in other respects.

What I claim as my invention, and desire to secure by Letters Patent, is—

A metal spoon, having the rivet which unites the handle and bowl made or formed of the same piece of metal with and forming part of the handle or bowl, substantially as herein described.

G. I. MIX.

Witnesses:
FRED HAYNES,
FERD TUSCH.